United States Patent
Tonetti et al.

(10) Patent No.: US 7,322,191 B2
(45) Date of Patent: Jan. 29, 2008

(54) DEVICE FOR IMPARTING A WHIRLING MOTION ON THE FLOW OF AIR FOR SUPPLYING A TURBO-SUPERCHARGED INTERNAL-COMBUSTION ENGINE

(75) Inventors: Marco Tonetti, Orbassano (IT); Giovanni Cornetti, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 58 days.

(21) Appl. No.: 11/319,213

(22) Filed: Dec. 28, 2005

(65) Prior Publication Data

US 2006/0156723 A1  Jul. 20, 2006

(30) Foreign Application Priority Data

Dec. 30, 2004 (EP) .................. 04425961

(51) Int. Cl.
F02B 33/44 (2006.01)

(52) U.S. Cl. .................................... 60/605.1
(58) Field of Classification Search ............... 60/605.1
See application file for complete search history.

(56) References Cited

U.S. PATENT DOCUMENTS

| | | | | |
|---|---|---|---|---|
| 1,857,070 A | * | 5/1932 | Thomas | 261/79.1 |
| 3,868,940 A | * | 3/1975 | Kirchweger | 123/188.14 |
| 3,926,215 A | * | 12/1975 | Macleod | 137/527.8 |
| 4,194,722 A | * | 3/1980 | Okerblom | 251/305 |
| 4,256,062 A | * | 3/1981 | Schafer | 123/308 |
| 4,577,602 A | * | 3/1986 | Showalter | 123/306 |
| 5,165,374 A | * | 11/1992 | Chapman et al. | 123/308 |
| 5,592,917 A | * | 1/1997 | Kim | 123/308 |
| 5,979,401 A | * | 11/1999 | Hickey | 123/306 |

(Continued)

FOREIGN PATENT DOCUMENTS

DE  42 13 047  10/1993

(Continued)

OTHER PUBLICATIONS

Patent Abstracts of Japan, vol. 009, No. 179, Jul. 24, 1985 & JP 60 047818, Mar. 15, 1985.

Primary Examiner—Thomas Denion
Assistant Examiner—Douglas J. Duff
(74) Attorney, Agent, or Firm—Nixon & Vanderhye PC

(57) ABSTRACT

A device for imparting a whirling motion on the flow of air for supplying a turbo-supercharged internal-combustion engine is designed to be interposed in the duct for supplying the air upstream of the supercharger for supercharging the engine. The device comprises an elbow-shaped portion of duct and partializing means, which are able to limit the section of passage in the upstream branch of the aforesaid elbow portion to an area which constitutes a fraction of the total section of the duct and which is adjacent to a wall of the duct. In this way, the downstream branch of the elbow portion is reached by a tangential flow that gives rise to a helical flow of the air in said downstream branch. The device enables creation upstream of the supercharger of a negative pressure sufficient for enabling a recirculation of exhaust gases, upstream of the supercharger, and at the same time imparts on the air flow a whirling movement that enables the supercharger to be exploited in the most efficient way.

7 Claims, 4 Drawing Sheets

U.S. PATENT DOCUMENTS 6,606,975 B1 * 8/2003 Caliskan et al. ............ 123/306

FOREIGN PATENT DOCUMENTS

| DE | 196 44 892 | 4/1998 |
|---|---|---|
| EP | 1 420 159 | 5/2004 |
| EP | 1 589 213 | 10/2005 |
| FR | 2 827 907 | 1/2003 |
| WO | WO 03/102391 | 12/2003 |

* cited by examiner

DEVICE FOR IMPARTING A WHIRLING MOTION ON THE FLOW OF AIR FOR SUPPLYING A TURBO-SUPERCHARGED INTERNAL-COMBUSTION ENGINE

BACKGROUND OF THE INVENTION

The present invention relates to a device for imparting a movement of rotation (whirl) on the flow of air for supplying a turbo-supercharged internal-combustion engine, particularly of the type with recirculation of the exhaust gases upstream of the supercharger.

A turbo-supercharged internal-combustion engine, with recirculation of the exhaust gases upstream of the supercharger, i.e., in the low-pressure stretch of the supply duct, has formed the subject of the preceding European patent application No. 04 425 279 filed in the name of the present applicant. In engines of this type, there is provided a throttle valve in the duct for supplying the air, upstream of the supercharger and upstream of the confluence of the duct for recirculation of the exhaust gases.

SUMMARY OF THE INVENTION

A purpose of the present invention is to provide a device that will be able on the one hand to perform the function of partialization of the engine intake that is traditionally obtained with a throttle valve and on the other hand to impart on the flow of air at inlet to the supercharger a movement of rotation (whirl) or pre-rotation (pre-whirl) which enables an increase in the efficiency of operation of the supercharger.

More in general, a purpose of the invention is to provide a device that is able to impart the aforesaid movement of whirl or pre-whirl on the flow of air for supplying an internal-combustion engine, also in the case, for example, where said engine is turbo-supercharged, but is not provided with an exhaust-gas-recirculation (EGR) system upstream of the supercharger.

With a view to achieving these and further purposes, the invention is characterized principally in that it comprises a portion of duct for the supply air, which is elbow-shaped, with an upstream branch and a downstream branch forming an angle between one another, and means partializing of the section of passage of the flow through said upstream branch of the elbow portion, which is able to limit said section of passage to an area that constitutes only a fraction of the total section of the duct, adjacent to a wall of the duct, in such a way that the downstream branch of the aforesaid elbow portion is reached by a localized tangential flow adjacent to a wall of the duct, which is thus forced, as a result of the change of direction from the upstream branch to the downstream branch, to traverse said downstream branch according to a substantially helical path.

In general, the aforesaid partializing means can be made in any known way, for example also through a gate valve that can be displaced between a condition of complete opening of the duct and a condition of closing, in which the passage of the flow of supply air through the duct is limited only to the aforesaid area adjacent to a wall of the duct. In the preferred embodiment, however, the partializing means are in the form of a throttle valve. Once again in the case of said embodiment, the upstream branch of the elbow portion has a squared (rectangular) cross section, and the aforesaid throttle valve is constituted by a vane mounted oscillating (rocking) about an axis that is set at a distance from the central axis of said branch of the duct so that, in the closed condition of the throttle valve, one end edge of said vane is in contact with a wall of the aforesaid upstream branch of the duct and the opposite edge is set at a distance from the wall of the duct facing it, in such a way as to leave free the aforesaid area corresponding to a fraction of the entire section of the duct, adjacent to a wall of the duct. Once again in the case of the preferred embodiment, the downstream branch of the elbow portion has, instead, a circular cross section which facilitates formation of the helical flow of the air through the downstream branch of the elbow portion when the throttle valve is in its closed condition of maximum partialization.

According to a further important characteristic that is proper to the preferred embodiment of the invention, the aforesaid oscillating vane constituting the throttle valve has a cross section with a winged profile, designed to maintain the air flow adherent to its opposite surfaces when the angle of inclination of the vane with respect to the longitudinal direction of the upstream branch of the elbow portion is smaller than a given value. Thanks to said characteristic, when the throttle valve is slightly moved away from its position of maximum opening, it induces in any case a flow of the supply air converging towards a wall of the duct, which gives rise again to a slight swirl of the flow following upon the change of direction in the passage from the upstream branch to the downstream branch of the elbow portion.

BRIEF DESCRIPTION OF THE DRAWINGS

The above and further characteristics and advantages will emerge in any case more understandable in the light of the ensuing description with reference to the annexed plate of drawings, which are provided purely by way of non-limiting example, and in which.

DETAILED DESCRIPTION OF THE DRAWINGS

Figure 1:
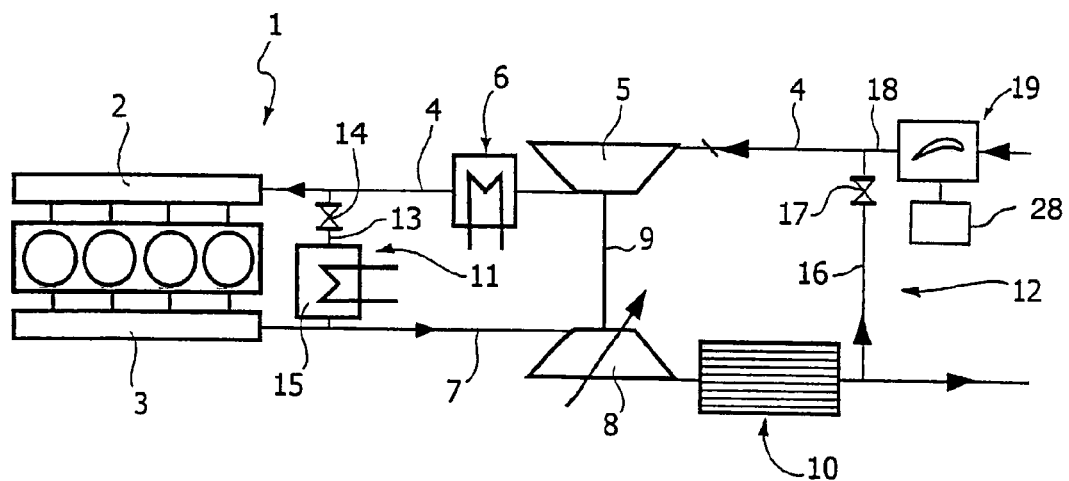
FIG. 1 is a diagram of the system for supplying a turbo-supercharged diesel engine, with recirculation of the exhaust gases upstream of the supercharger, to which the device according to the invention is applied.

In FIG. 1, the reference number 1 designates as a whole a four-cylinder diesel engine, with an intake manifold 2 and an exhaust manifold 3. The intake manifold 2 receives the supply air through a duct 4, in which there is set a supercharger 5. In the duct 4, upstream of the supercharger 5 there is moreover set, in a way in itself known, a cooling device or intercooler 6. The exhaust manifold 3 is connected to an exhaust piping 7, in which there are set: a turbine 8, which is connected mechanically by means of a shaft 9 to the supercharger 5 for the purpose of driving it in rotation; and a particulate filter 9. In the example illustrated, there are envisaged both a system 11 for exhaust-gas recirculation according to a short route immediately upstream of the intake manifold 2 and a system 12 for exhaust-gas recirculation according to a long route upstream of the supercharger 5. The system 11 comprises a duct 13, which is controlled by a valve 14 and in which there is set an intercooler 15. The EGR system 12 comprises a duct 16 controlled by a valve 17. The duct 13 sets the exhaust duct 7 directly in communication with the intake duct 4 upstream of the manifold 2, whilst the duct 16 causes recirculation of the exhaust gases, or a part thereof, at outlet from the particulate filter 10 into the intake duct 4, upstream of the supercharger 5.

Set in the intake duct 4, upstream of the confluence 18 of the EGR duct 16 is a device 19 according to the present invention.

Figure 2:
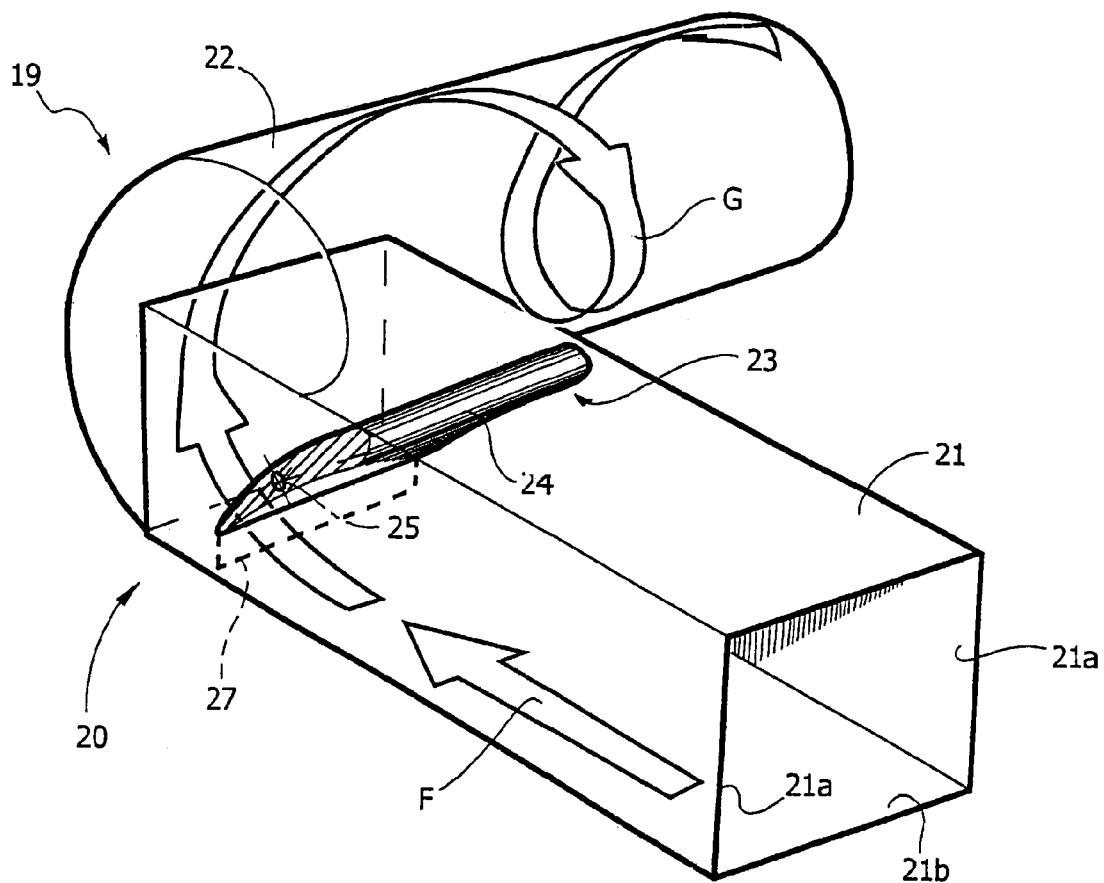
FIG. 2 is a schematic perspective view illustrating the working principle of the device according to the invention.
Figure 3:
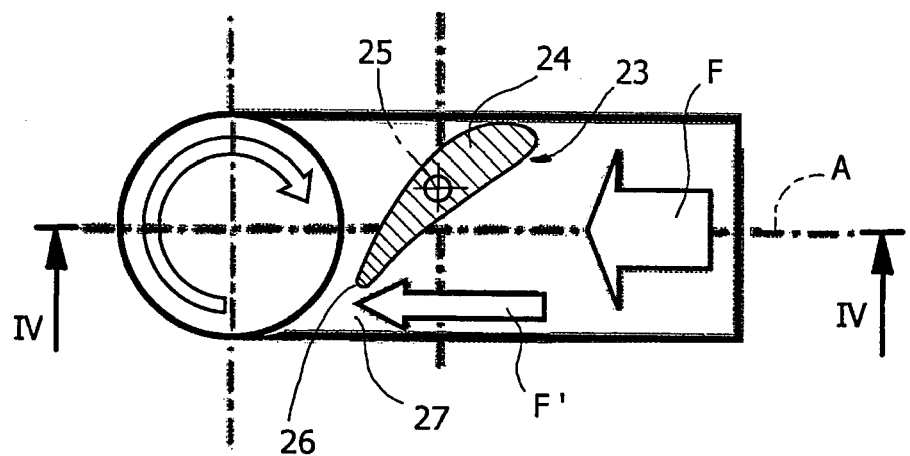
FIGS. 3 and 4 are cross-sectional views of the device of FIG. 2.
Figure 4:
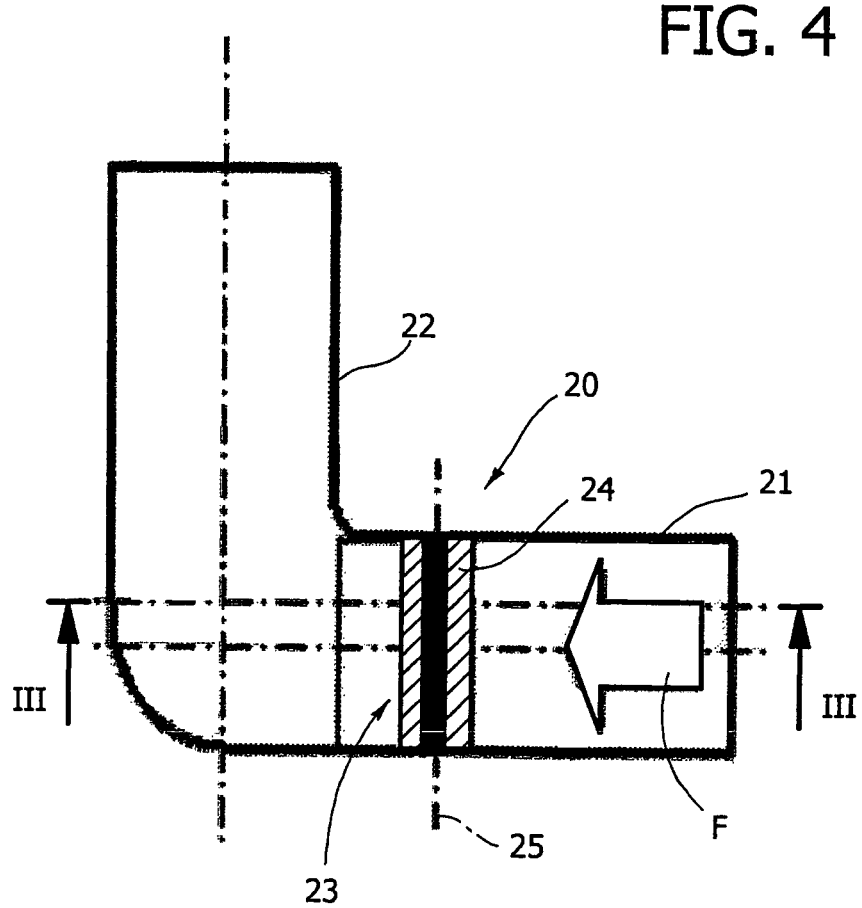

FIG. 2 is a schematic perspective view of the device 19. Said device basically comprises an elbow portion of duct 20, with an upstream branch 21, which in the example illustrated has a rectangular cross section, and a downstream branch 22, which in the example illustrated has a circular cross section. The two branches 21, 22 form between one another an angle close to 90° in the case of the example illustrated. In the upstream branch 21 there is moreover set a throttle valve 23 designed to partialize the section of passage of the flow of air through the upstream branch 21. In the example illustrated, the throttle valve 23 has a vane member 24, mounted oscillating like a rocker about an axis 25, which is oriented transversely with respect to the direction of flow of the supply air to the inlet of the branch 21 and which is orthogonal to two opposite walls 21a of the branch 21. As may be seen more clearly in FIG. 3, the axis of oscillation 25 of the vane 24 constituting the throttle valve 23 is set at a distance from the axis A of the upstream branch 21 of the elbow portion 20 in such a way that, when the vane 24 is in its position of maximum closing of the duct (illustrated in FIG. 3), in which one of its end edges enters into contact with the wall of the duct 23, the opposite edge of the wall 24, designated by 26, in any case leaves free for the passage of the air an area 27 that constitutes only a fraction of the entire section of the branch of duct 21, adjacent to the bottom wall 21b (with reference to the drawing).

Consequently, when the throttle valve 23 is in its condition of maximum closing, upstream of the throttle valve there arrives a concentrated flow adjacent to the wall 21b and set at a distance from the axis A (FIGS. 2 and 3), which gives rise, as a result of the change of direction from the branch 21 to the branch 22 (see FIG. 2), to a rotary or whirling movement of the flow itself. Consequently, the air flow upstream of the throttle valve 23 traverses the downstream branch 22 according to a helical path, as indicated schematically by the arrows G in FIG. 2.

According to a further important characteristic of the invention, the vane 24 has a profile of a winged type so that, when it is inclined a little with respect to the axis A of the branch of duct 21 (see FIG. 5c), the air flow that laps its two opposite faces tends to remain adherent to said faces so as to be deflected in the direction of the wall 21b.

The provision of the device 19 upstream of the confluence 18 of the EGR duct 16 enables creation of a negative pressure, so closing the throttle valve 23, which increases the difference in pressure at the ends of the EGR duct 16. This enables recirculation of the exhaust gases in conditions in which the difference of pressure between the outlet of the particulate filter 10 and the inlet to the supercharger 5 would not normally be sufficient. Furthermore, it thus improves also the characteristic of regulation of the valve 17 set in the EGR duct 16.

In addition to the advantage specified above, the device according to the invention enables imparting the whirling motion described above on the flow of the supply air, to the advantage of the efficiency of operation of the supercharging system.

Figure 5:
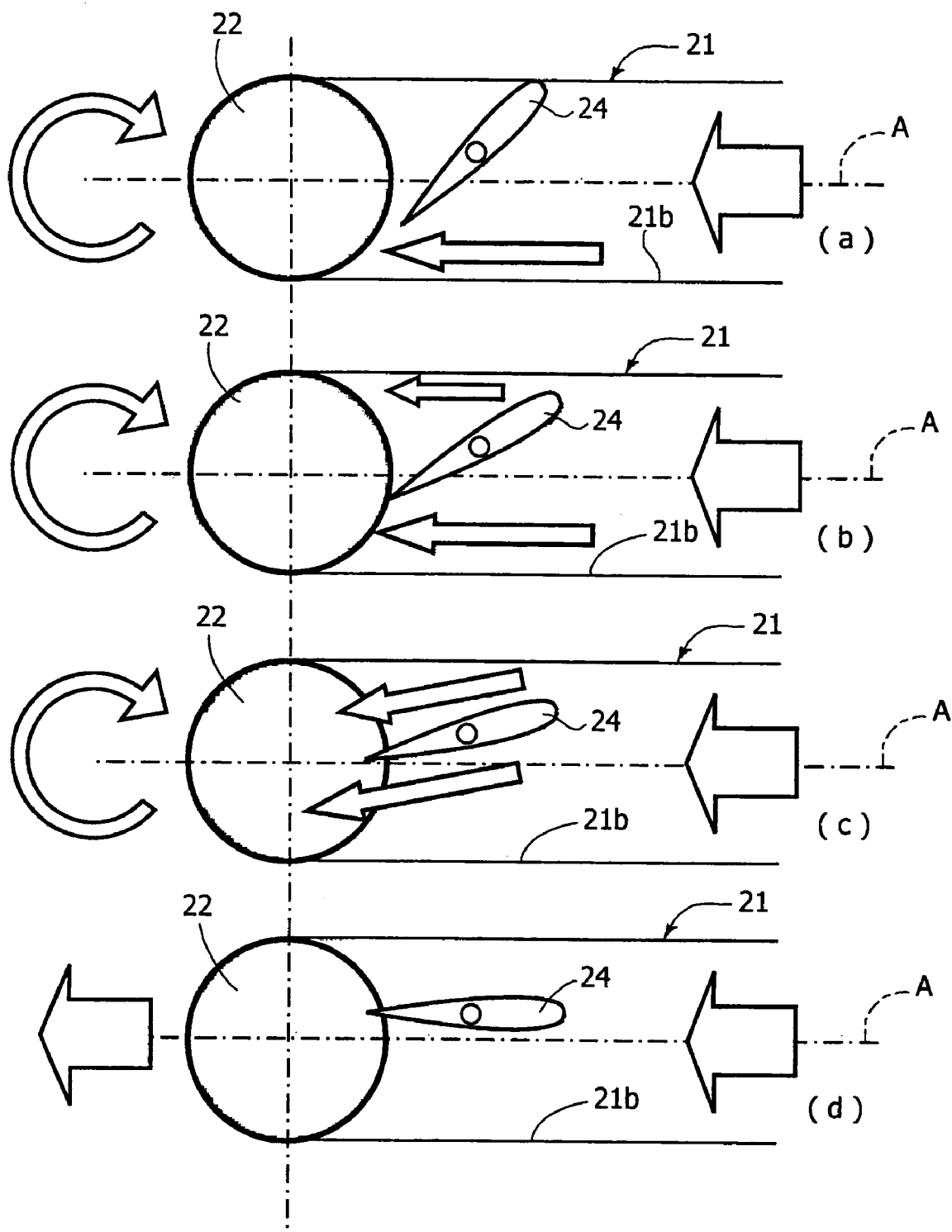
FIG. 5 is a schematic illustration of a series of different operating conditions of the device.

FIG. 5 illustrates various positions for regulation of the vane 24 of the throttle valve 23. In the condition illustrated in FIG. 5(a), the vane 24 reaches the maximum inclination with respect to the axis A of the branch of duct 21 and consequently generates the maximum negative pressure. In said condition, there is also obtained a maximum effect in the generation of the whirling movement, thanks to the tangential introduction of the flow of air in the downstream branch 22 of the portion of duct 20 that takes to the supercharger. The gap 27 for passage of fluid is sized so as to ensure a negative pressure sufficient for the recirculation of the amount of gas desired in all the conditions of operation of the engine.

In the condition illustrated in FIG. 5(b), the top edge (as viewed in the figure) of the vane 24 moves away from the corresponding wall of the duct so that the air is free to pass either below or above the vane. Since the inclination of the vane 24 with respect to the axis A remains considerable, the flow that laps the two opposite faces of the vane is "detached" with respect to the surface of the vane. The flow of air above the vane of course produces a decrease both in the effect of pre-whirl, and in the effect of suction pressure.

In the condition illustrated in FIG. 5(c), in which the inclination of the vane 24 with respect to the axis A becomes relatively small, the aerodynamic profile of the vane 24 enables the flow that laps its two opposite faces to remain adherent thereto. Consequently, there derives therefrom a deflection of the entire flow of air downwards (as viewed in the figure) in the direction of the wall 21b, with consequent increase of the effect of pre-whirl thus obtained, with respect to what occurs in the situation of FIG. 5(b). In said condition, the resistance to the flow is reduced considerably. The greater the optimization of the profile of the vane, the smaller the drop in pressure with the pre-whirl generated. This operating mode is particularly interesting for those conditions of operation of the engine in which there is no recirculation of exhaust gases, so that negative pressure is not required, but in which the behaviour of the supercharger improves, increasing the level of pre-whirl.

Finally, in the condition illustrated in FIG. 5(d), the vane 24 is parallel to the axis A, so that there is obtained the minimum resistance to the flow and the total disappearance of the effect of pre-whirl, which on the other hand is not essential at high r.p.m.

Figure 6:
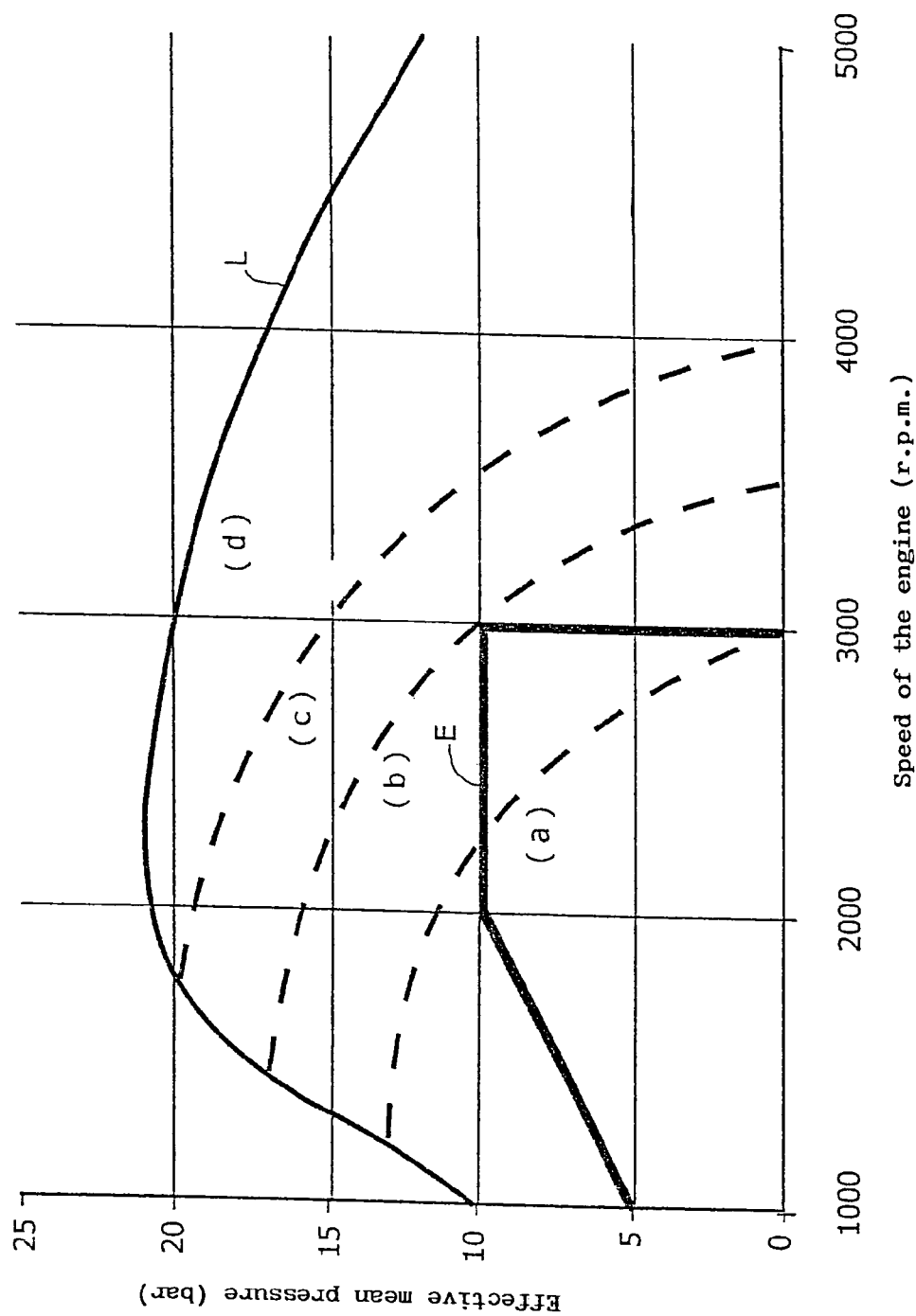
FIG. 6 is a diagram illustrating a possible criterion of use of the device according to the invention.

FIG. 6 shows a diagram that provides a possible criterion of use of the device according to the invention in a diesel engine. Each point of the plane of FIG. 6 corresponds to a specific condition of operation of the engine, determined by a given value of rotation and by a given value of the effective mean pressure. The diagram is divided into areas (a), (b), (c) and (d) under a curve L indicating the condition of full load. Each area corresponds to the condition of operation designated by the same letter in FIG. 5. The line E provides the limit of the conditions of operation in which recirculation of the exhaust gases occurs. As may be seen, at low load and at low speed of the engine the vane is in the position of maximum closing (a) and is displaced towards the condition of maximum opening as the load and speed increase. In the points of full load and at low speed, the motion of pre-whirl enables displacement, at higher values of the supercharging pressure, of the onset of surging phenomena in the supercharger. It is thus possible to supercharge to a greater extent with an increase in engine performance. As the speed rises, it is advisable to open the device gradually, i.e., reduce the angle of incidence of the vane, in order to contain the loss of head which grows on account of the increase in the flow rate. At full load, beyond 2000 r.p.m., the rotation of the air at inlet to the supercharger does not yield any further advantage.

At the points of partial load, it is necessary to guarantee sufficient negative pressure for recirculating the amount of gas desired. The vane works then at wide angles (positions (a) and (b)). The pre-whirl generated by the device in these conditions enables at the same time improvement in the efficiency of the supercharger, reducing the work recovered in the turbine and consequently the counterpressure at the exhaust. This results in a reduction in fuel consumption and in emissions.

As compared to the system previously proposed by the present applicant, which envisaged EGR upstream of the supercharger, i.e., in the low-pressure stretch of the supply duct, with a throttle valve at the inlet of the supercharger, the device according to the invention enables the following benefits to be obtained:

increase in the performance of the engine at low r.p.m., principally thanks to the higher admissible supercharging pressures, without incurring in surging of the supercharger; and lower consumption at partial load on account of the increase in the efficiency of the supercharger, and potentially lower emissions on account of the reduction in the fuel introduced, associated to lower levels of consumption.

As compared to other known devices that are able to generate whirling of the flow of supply air at the inlet of the supercharger, the device according to the invention presents the advantage of not entailing any increase in cost with respect to an engine equipped with a system for recirculation of gases at low pressure, as well as the advantage of enabling a convenient installation of the device.

The engine according to the invention is provided with an electronic control unit 28 in FIG. 1 which controls actuator means of any known type (not illustrated) that control opening of the throttle valve according to signals issued by sensors for detecting the engine r.p.m. and load, according to any predetermined logic, for example on the basis of a map of the type illustrated in FIG. 6.

Of course, without prejudice to the principle of the invention, the details of construction and the embodiments may vary widely with respect to what is described and illustrated herein purely by way of example, without thereby departing from the scope of the present invention.

What is claimed is:

1. A device for imparting a whirling motion on the flow of air for supplying a turbo-supercharged internal-combustion engine, of the type with exhaust-gas recirculation (EGR) upstream of the supercharger, said device comprising an elbow-shaped portion of duct for the supply air, with an upstream branch and a downstream branch forming an angle between them; and means for partializing the section of passage of the flow of air through said upstream branch, which is able to limit the section of passage of the fluid to an area that constitutes only a fraction of the total section of duct, adjacent to a wall of the duct, in such a way that the downstream branch of the aforesaid elbow portion is reached by a localized tangential flow adjacent to a wall of the duct that is thus forced, as a result of the change in direction from the upstream branch to the downstream branch, to traverse said downstream branch according to a substantially helical path, wherein said partializing means comprise a throttle valve with a vane mounted oscillating about an axis in the upstream branch of the aforesaid elbow portion of duct, and wherein said upstream branch has a squared or rectangular cross section, in that said axis of oscillation of the vane is orthogonal to two opposite walls of the aforesaid upstream branch of the duct, and in that said axis of oscillation is set at a distance from the central axis of said upstream branch in such a way that, when one end of the vane is in contact with a wall of the duct, the opposite end is set at a distance from the facing wall of the duct so as to leave free the aforesaid area of passage.

2. The device according to claim 1, wherein the aforesaid downstream branch has a circular cross section.

3. The device according to claim 1, wherein said vane has a profile with an aerodynamic wing so that, when said vane has a reduced inclination with respect to the axis of said upstream branch, the flow of air that laps the two opposite faces of the vane tends to remain adherent thereto in such a way that the entire flow is deflected by the vane in the direction of a wall of the duct.

4. An internal-combustion engine, comprising a supercharger interposed in a duct for supplying the air to the engine, wherein the engine comprises a device according to claim 1 interposed in the supply duct upstream of the supercharger.

5. The internal-combustion engine according to claim 4, wherein the aforesaid device is interposed in the supply duct upstream of the confluence of a duct for recirculation of the exhaust gases.

6. The engine according to claim 5, wherein said EGR duct branches off from an exhaust duct of the engine, upstream of a turbine for driving the supercharger and upstream of a particulate filter.

7. The engine according to claim 4, wherein the engine is provided with an electronic control unit, which controls actuator means for controlling the aforesaid throttle valve according to signals indicating the engine r.p.m. and load and enables increase in the degree of opening of the throttle valve as the load and r.p.m. increase, according to a predetermined criterion.

* * * * *